(12) United States Patent
Kreisel et al.

(10) Patent No.: US 9,715,813 B1
(45) Date of Patent: Jul. 25, 2017

(54) VISIBILITY ELECTRONIC CONTROLLER AND CURRENT-BASED STATUS MONITOR

(71) Applicant: Durex International Corp., Cary, IL (US)

(72) Inventors: James H. Kreisel, Winona, MN (US); Jason S. Smith, Oakwood Hills, IL (US); Casey C. Clausen, Portland, OR (US); Randall C. Nelson, Crystal Lake, IL (US); Thomas J. Restis, Buffalo Grove, IL (US)

(73) Assignee: Durex International Corp, Oakwood Hills, IL (US)

( * ) Notice: Subject to any disclaimer, the term of this patent is extended or adjusted under 35 U.S.C. 154(b) by 0 days.

(21) Appl. No.: 14/635,156

(22) Filed: Mar. 2, 2015

Related U.S. Application Data

(60) Provisional application No. 61/946,868, filed on Mar. 2, 2014.

(51) Int. Cl.
| | |
|---|---|
| G08B 21/00 | (2006.01) |
| G08B 21/18 | (2006.01) |
| F21V 33/00 | (2006.01) |
| F21W 111/00 | (2006.01) |

(52) U.S. Cl.
CPC ............ G08B 21/187 (2013.01); F21V 33/00 (2013.01); F21W 2111/00 (2013.01)

(58) Field of Classification Search
CPC ............. H05B 1/0244; G05D 23/1928; G05D 23/1935; G05D 23/22; Y10T 307/469; Y10T 307/484; G08B 21/187; F21V 33/00; F21W 2111/00; G01R 19/145; G01R 19/15; G01R 19/0092; G01R 19/1659; G01R 31/024
USPC ........ 340/664, 657, 655, 640, 635; 219/486, 219/487, 483, 492; 307/38, 41
See application file for complete search history.

(56) References Cited

U.S. PATENT DOCUMENTS

| | | | | |
|---|---|---|---|---|
| 2002/0159250 | A1* | 10/2002 | Kuo ....................... | A42B 3/044 362/106 |
| 2006/0229740 | A1 | 10/2006 | Kreisel et al. | |
| 2006/0230298 | A1 | 10/2006 | Bohlinger et al. | |
| 2007/0235440 | A1 | 10/2007 | Gu et al. | |
| 2007/0236344 | A1* | 10/2007 | Desrosiers .............. | G08B 3/10 340/539.15 |
| 2010/0171606 | A1* | 7/2010 | Law ..................... | B60Q 1/2607 340/468 |
| 2013/0307678 | A1* | 11/2013 | Ransom .................. | B62J 6/005 340/432 |

\* cited by examiner

*Primary Examiner* — Anh V La
(74) *Attorney, Agent, or Firm* — Charmasson, Buchaca, Leach, LLP

(57) ABSTRACT

An electronic module housing having a rounded stylized dog-bone-type shape and an equatorial partial light bar. The shape provides a view of parts of the light bar from many locations. The controller circuitry can detect a malfunction among one or more of a plurality of current-drawing components by detecting that the total cumulative current drawing by all the components falls outside a predetermined nominal range.

6 Claims, 12 Drawing Sheets

VISIBILITY ELECTRONIC CONTROLLER AND CURRENT-BASED STATUS MONITOR

PRIOR APPLICATION

This application claims the benefit of U.S. Provisional Patent Application Ser. No. 61/946,868, filed 2014 Mar. 2.

FIELD OF THE INVENTION

The invention relates to electronics, and more particularly to electronic control modules used in low visibility environments for controlling a number of current drawing electronic or electrical components.

BACKGROUND

Electrical components such as heaters can be controlled by a microprocessor-based controller module as shown in Gu et al., U.S. Patent Application Publication No. US2007/0235440; Bohlinger et al., U.S. Patent Application Publication No. US2006/0230298; and, Kreisel et al., U.S. Patent Application Publication No. US2006/0229740; all of which are incorporated herein by reference.

Currently, such modules are difficult to see in the cramped confines of the fluid line spaces. Further, it can be difficult, time-consuming and error prone to discover when a particular fluid line heater is malfunctioning.

Therefore there is a need for a electronic controller which provides better visibility and/or can detect that a malfunction has occurred in a number of components being controlled by it.

Therefore there is a need for an electronic controller which addresses some or all of the above identified inadequacies.

SUMMARY

The principal and secondary objects of the invention are to help provide an improved electronic controller. These and other objects are achieved by a controller module housing having a more easily viewed visual status indicator and/or a current-based sensor that can detect whether a current-supplied component is malfunctioning.

The original text of the original claims is incorporated herein by reference as describing features in some embodiments.

DESCRIPTION OF THE EXEMPLARY EMBODIMENTS

Figure 1:
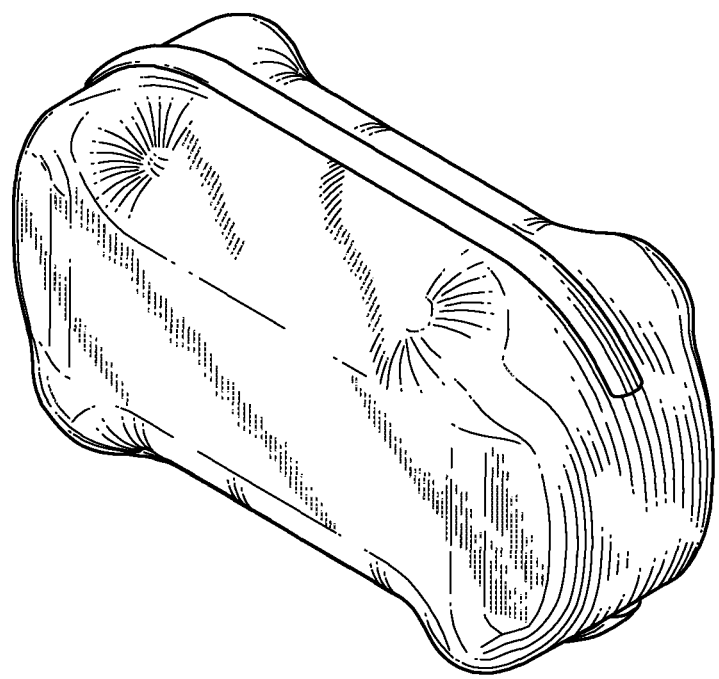
FIG. 1 is a top, front, left side perspective view of an improved visibility electronic controller module, the bottom, back, right side view being a mirror image thereof.
Figure 2:
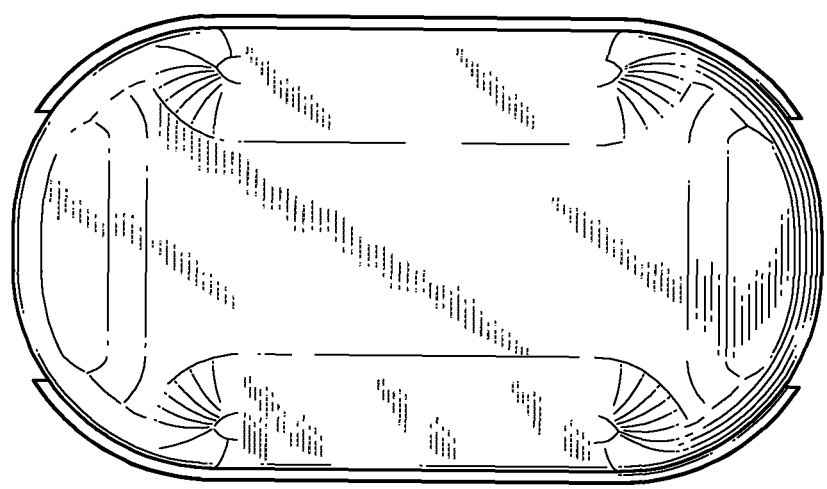
FIG. 2 is a top plan view thereof, the bottom plan view being the same.
Figure 3:
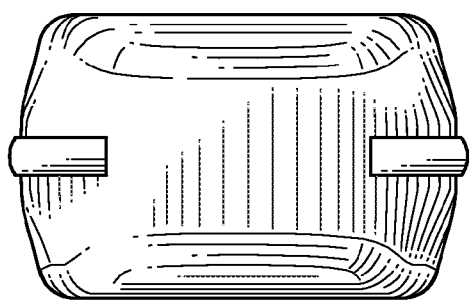
FIG. 3 is a front plan view thereof, the back plan view being the same.
Figure 4:
FIG. 4 is a left side plan view thereof, the right side plan view being the same.
Figure 5:
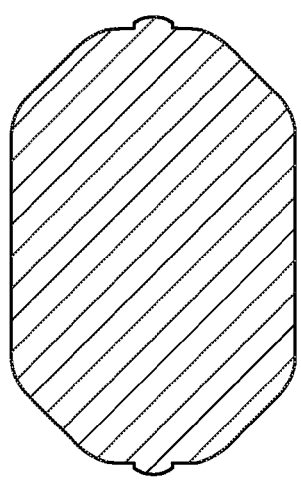
FIG. 5 is a cross-sectional front view of the module of FIG. 1 taken diametrically through the center of the module by a plane perpendicular to the elongation axis of the module.
Figure 6:
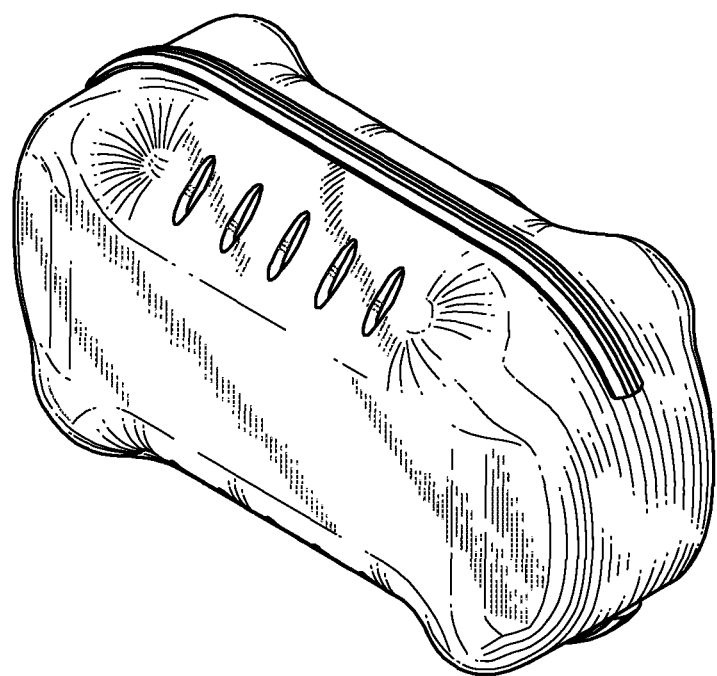
FIG. 6 is a top, front, left side perspective view of an improved visibility electronic controller module showing an alternate embodiment of our new design having a front-to-back row of five ventilation holes formed into the four flattened transitional edges at the junctions of the top, left side, bottom and right side regions.
Figure 7:
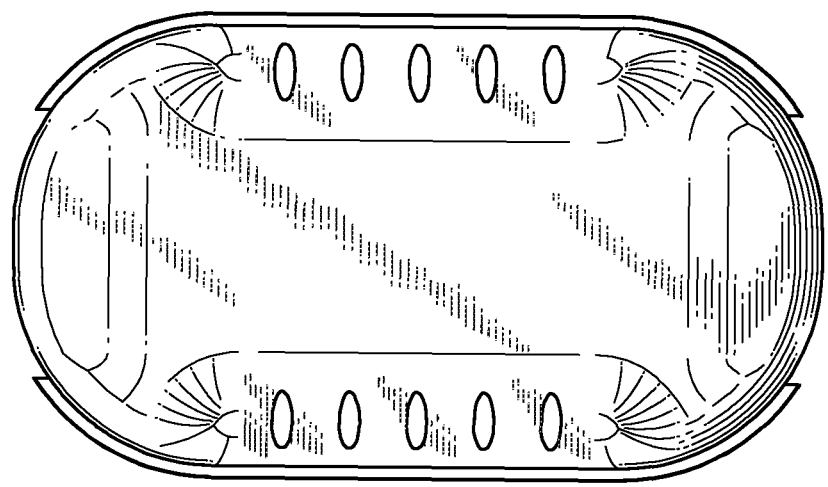
FIG. 7 is a top plan view thereof, the bottom plan view being the same.
Figure 8:
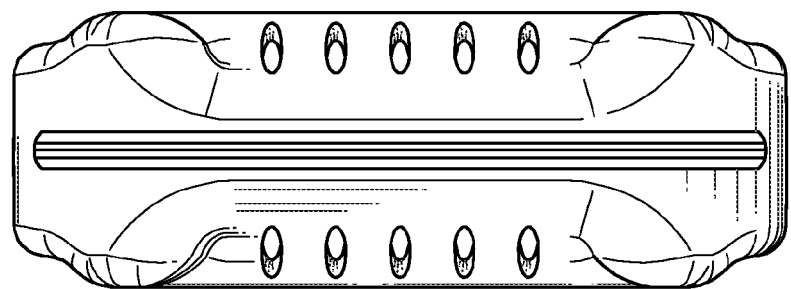
FIG. 8 is a front plan view thereof, the back plan view being the same.
Figure 9:
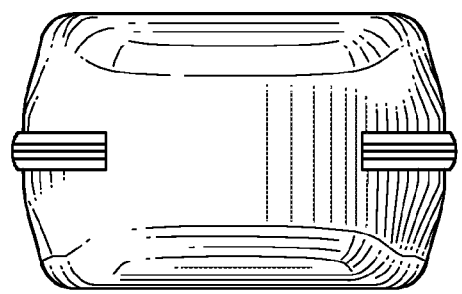
FIG. 9 is a left side plan view thereof, the right side plan view being the same.
Figure 10:
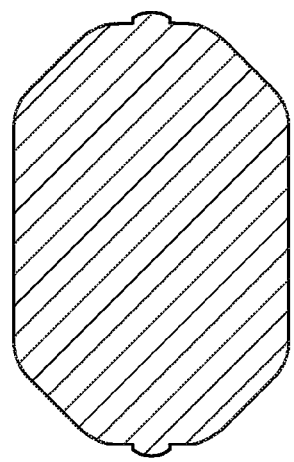
FIG. 10 is a cross-sectional front view of the module of FIG. 6 taken diametrically through the center of the module by a plane perpendicular to the elongation axis of the module.
Figure 11:
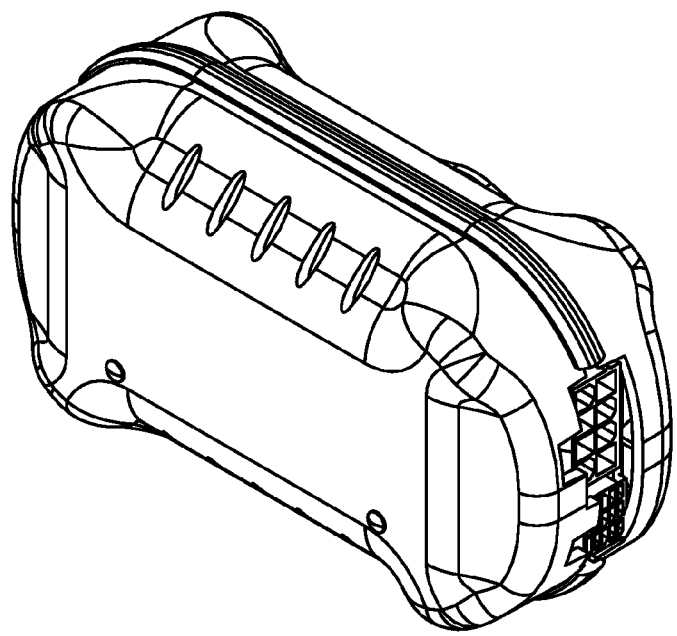
FIG. 11 top, front, left side perspective view of an improved visibility electronic controller module showing an alternate embodiment of our new design having the four front-to-back rows of ventilation holes similarly located to the design in FIG. 6, and showing curved surface transition lines, electronic interconnect ports at the front and back ends, and a bottom mounting bracket.
Figure 12:
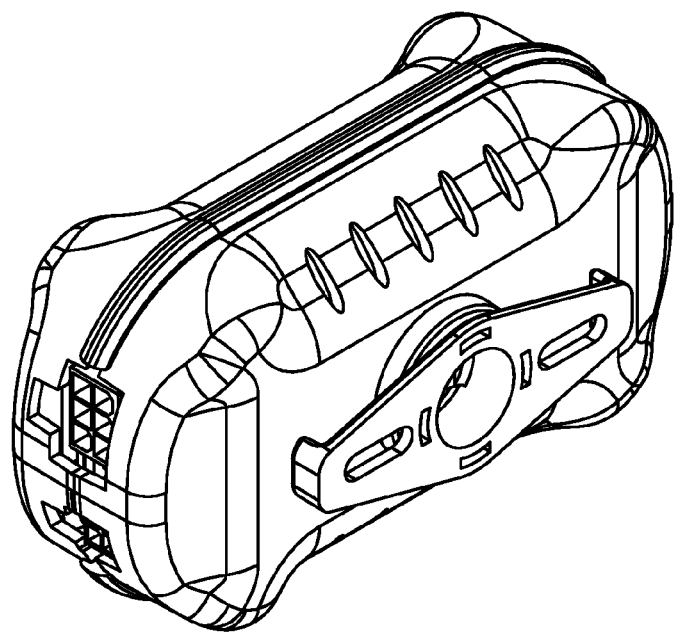
FIG. 12 is a bottom, back, right side perspective view thereof.
Figure 13:
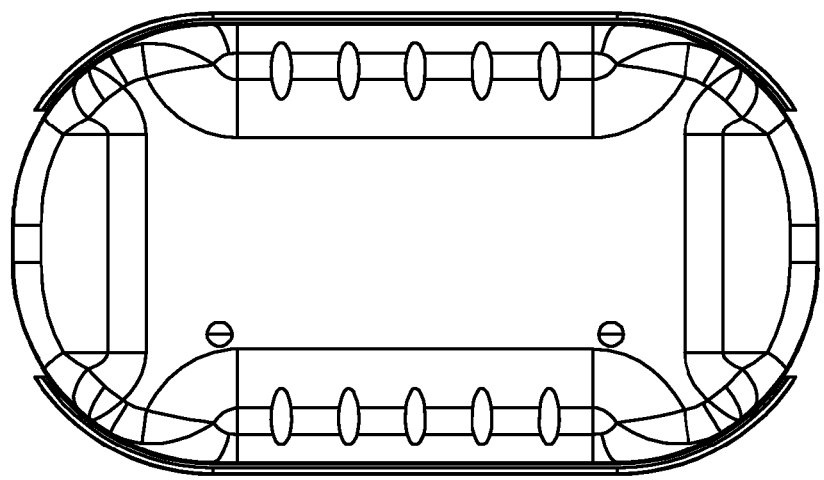
FIG. 13 is a top plan view thereof.
Figure 14:
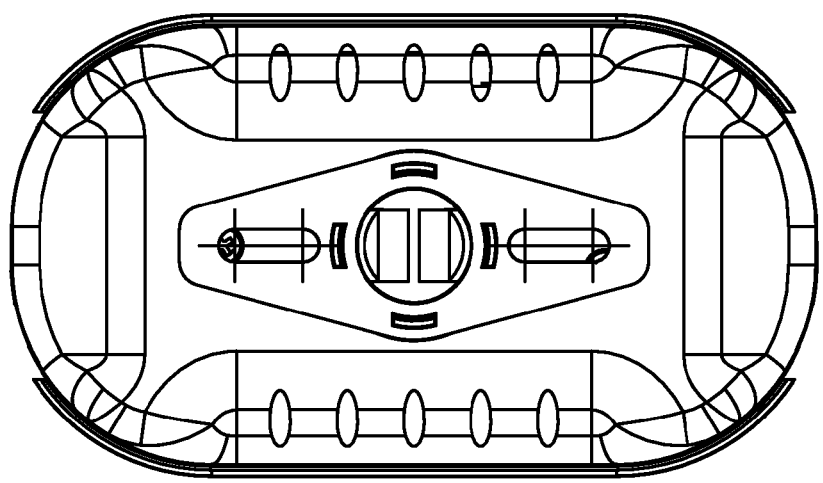
FIG. 14 is a bottom plan view thereof.
Figure 15:
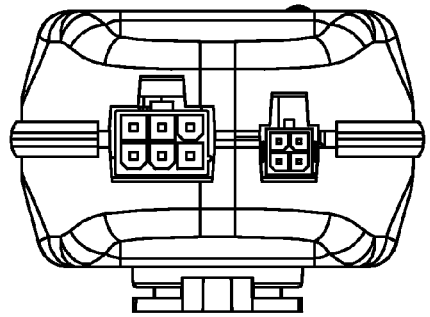
FIG. 15 is a front plan view thereof.
Figure 16:
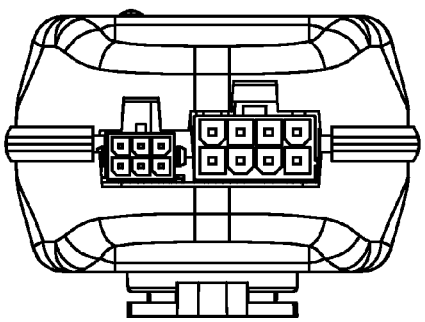
FIG. 16 is a back plan view thereof.
Figure 17:
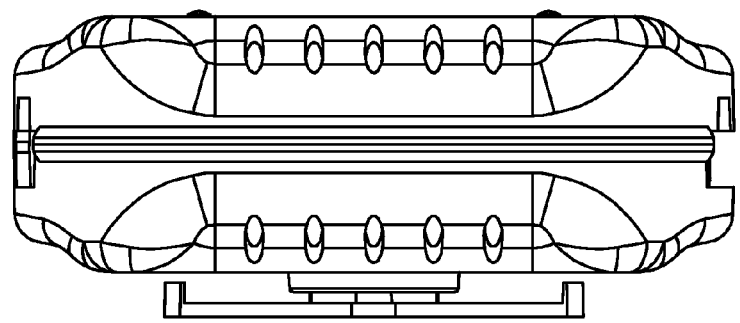
FIG. 17 is a right side plan view thereof, the left side being a mirror image thereof.
Figure 18:
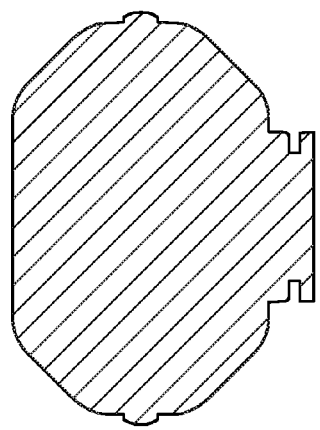
FIG. 18 is a cross-sectional front view of the module of FIG. 11 taken diametrically through the center of the module by a plane perpendicular to the elongation axis of the module.

Referring now to the drawing, there is illustrated in FIGS. 1-5 our design for an embodiment of an improved visibility electronic module used for example to control fluid line heaters used in semiconductor fabrication facilities. FIGS. 6-10 show a design for an alternate embodiment of an improved visibility electronic module having ventilation holes. FIGS. 11-18 show a design for an alternate embodiment of an improved visibility electronic module having ventilation holes, curved surface transition lines, a mounting bracket and electronic interconnect ports. It shall be understood that the improved visibility housing can be used for many types of electronic devices used in environments of obstructed or otherwise limited visibility. The preferred embodiment is described with reference to fluid line heater controllers by way of example only. Those skilled in the art of electronic system housing design will readily appreciate the applicability of the design to other limited visibility applications. It shall be understood that the term "fluid lines" can include conduits such as gas and liquid supply and evacuation lines including vacuum lines leading to and from equipment used in semiconductor fabrication.

The shape of the housing can be described as a rounded stylized dog-bone-type shape having substantially oval multiview orthographic projections. These views can be defined as the top, bottom, front, back, left side and right side orthographic views corresponding to FIGS. 2-4 respectively. Between the front and back ends, however, the cross-sectional shape reduces to a more octagonally rounded-off cross-section as shown more clearly in FIG. 5. The perimeter of the top/bottom projection shows an enlarged light bar structure extending substantially a uniform width beyond the periphery of the housing at its equator. Symmetric breaks in the light bar structure occur at the front and back ends. This light bar structure substantially bisects the front/back surfaces and the two side surfaces as shown in the front, back and side views. Planes bisecting the shape orthogonal to the viewing axis of any one of the orthographic views will form two symmetric halves. With respect to the design of FIGS. 11-18, the mounting bracket and electronic interconnect ports can make the top and bottom, and front and back portions non-symmetric to one another.

In other words, the housing shape can have opposite, spaced apart front and back surfaces; opposite, spaced apart top and bottom surfaces; and, opposite, spaced apart left and right side surfaces. The top/bottom surfaces are substantially mutually orthogonal to the front/back surfaces which are substantially mutually orthogonal to the side surfaces. The word substantially is used in this case because the surfaces can be curved. The surfaces meet at rounded edges and corners.

Figure 19:
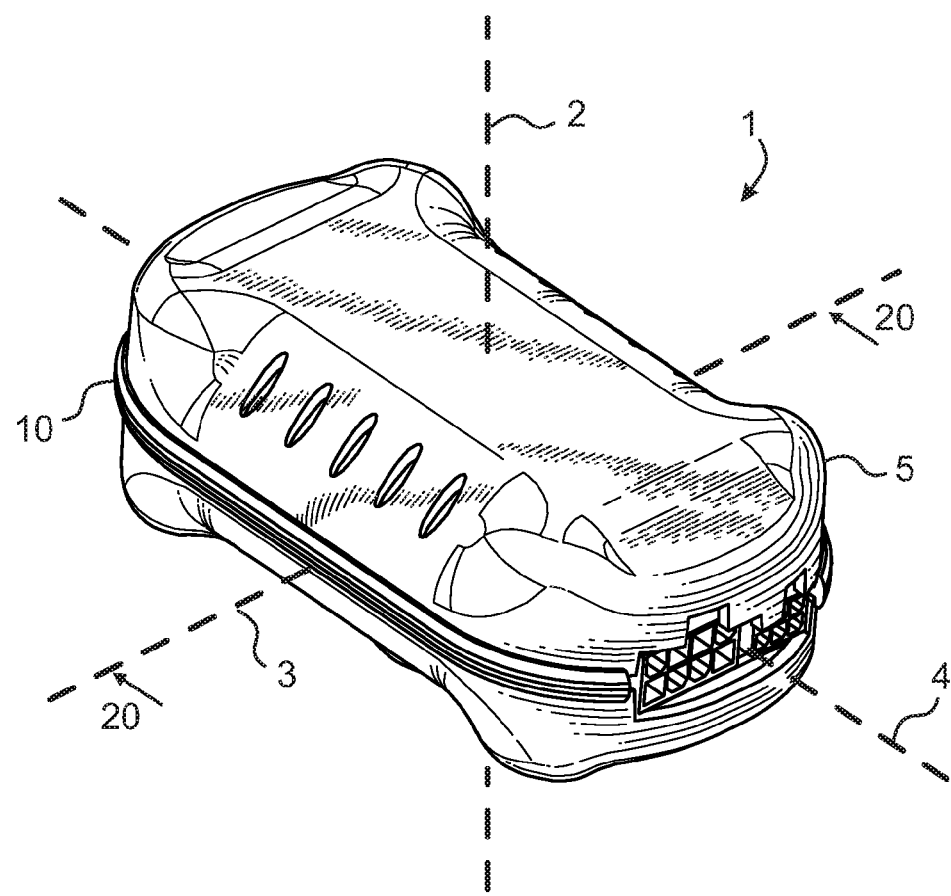
FIG. 19 is a top, front, left side perspective view of an improved visibility fluid line heater controller module showing three mutually orthogonal orientation axes.

As shown in FIG. 19 a coordinate system can be selected where three mutually orthogonal axes 2,3,4 pass through the center of the module 1. These axes can be the longitudinal axis 2, the latitudinal axis 3, and the elevational axis 4. The elevational axis can pass through viewpoints substantially showing the top and bottom views. The latitudinal axis can pass through viewpoints substantially showing the left and right side views. The longitudinal axis can pass through viewpoints substantially showing the front and back views.

Figure 20:
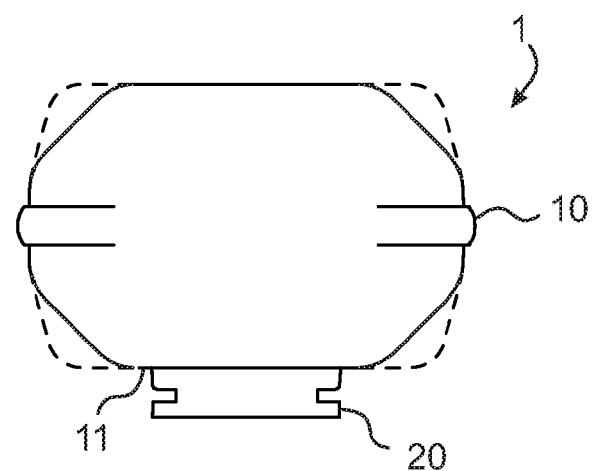
FIG. 20 is a cross-sectional front view of the module of FIG. 19 taken diametrically through the center of the module by a plane perpendicular to the longitudinal elongation axis of the module.

Referring primarily to FIGS. 19-22, a utilitarian aspect of the shape of the housing 5 and light bar structure 10 will be described. First, as shown in FIG. 20, the stylized rounded dog-bone shape provides a substantially flat surface 11 on the bottom of the module for attaching a mounting bracket 20 which can be adapted to conveniently secure the module to a fluid line heater or other structure.

Second, from a relatively long distance, i.e. greater than two times the front-to-back dimension of the housing, views taken along the mutually orthogonal axes 2,3,4 reveal at least some portion of the integrated light bar structure 10. Is it apparent that views from such a long distance not along the axes will reveal some portion of the light bar as well. In this way, the light bar can be readily seen from a long distance regardless of the orientation of the module. This is important in the often cramped and crowded environment of fluid lines such as gas and liquid supply and evacuation lines leading to and from equipment used in semiconductor fabrication.

Figure 21:
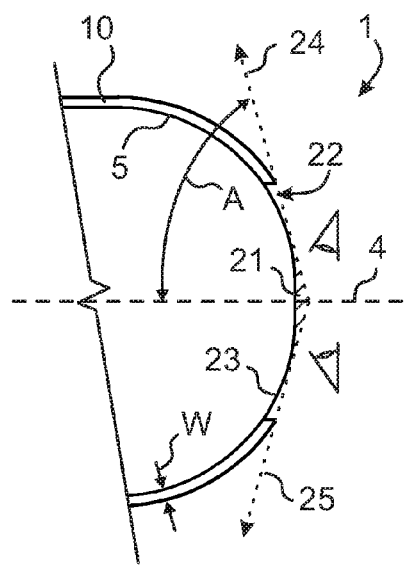
FIG. 21 is a stylized, partial, cross-sectional top view of the front end of the module of FIG. 19 showing light bar invisibility at the front end.
Figure 22:
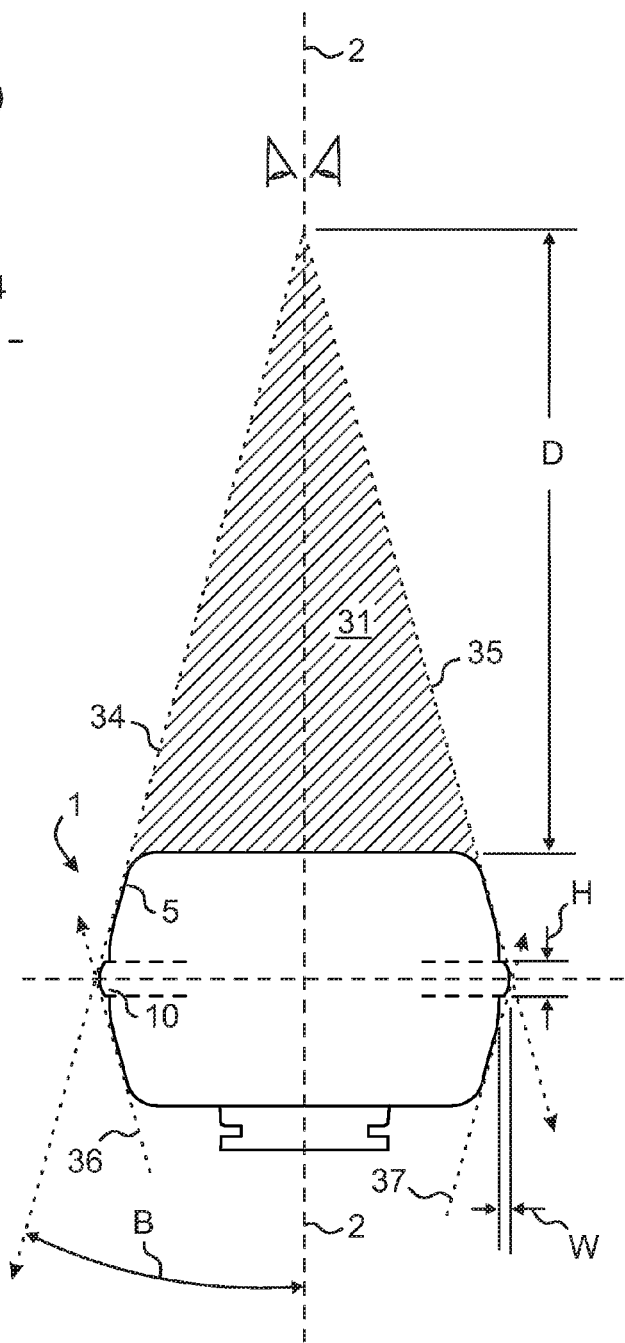
FIG. 22 is a stylized, cross-sectional front view of the module of FIG. 19 showing light bar invisibility at the top of the module.

The high visibility of the light bar from a long distance results from a synergy between the shape of the housing and the dimensioning of the light bar. The elongated light bar 10 courses along the perimeter of the module within the plane defined by the longitudinal axis 3 and the latitudinal axis 4. As shown in FIGS. 21-22, the light bar 10 extends a substantially uniform width W from the outer surface of the housing 5. The light bar has a substantially uniform height dimension H in the elevational direction.

The primary zones of non-visibility of the light bar can occur at relatively close distances to the module, i.e. distances less than two times the front-to-back dimension of the housing.

FIG. 21 shows a partial top view of the module 1 where a first zone 21 of invisibility occurs due to the break 22 in the light bar 10 at the front end and the back end 23. Line of sight views taken from the longitudinal axis 4 toward the closest portion of the light bar will be obscured by the convex end of the module when the angle A formed between the line of sight 24,25 and the longitudinal axis is greater than about 75 degrees. Clearly such angles occur only when the viewing location is very close to the module.

FIG. 22 shows a front end view of the module 1 where a second zone 31 of invisibility occurs due to the height and width of the light bar 10, and the convex shape of the housing 5 near its rounded edges. Beginning at a certain maximum distance D from the module, line of sight views 34,35 taken from the elevational axis 2 toward the closest portion of the light bar will be obscured by the convex top or bottom of the module when the angle B formed between the line of sight 34,35 and the elevational axis is greater than about 15 degrees. Clearly such angles occur only when the viewing location is less than about two times the front-to-back dimension of the module. Because the housing shape is substantially symmetrical with respect to each of the planes defined by the orthogonal axes, the first and second zones (not shown) also occur on the opposite sides of the housing when viewed from similar line-of-sight directions/locations such as 36,37.

It shall be understood that the rounded corners and ends of the housing help improve visibility and do not exhibit sharp surfaces which could snag items of clothing, cables or other materials that may inadvertently contact the module.

Figure 23:
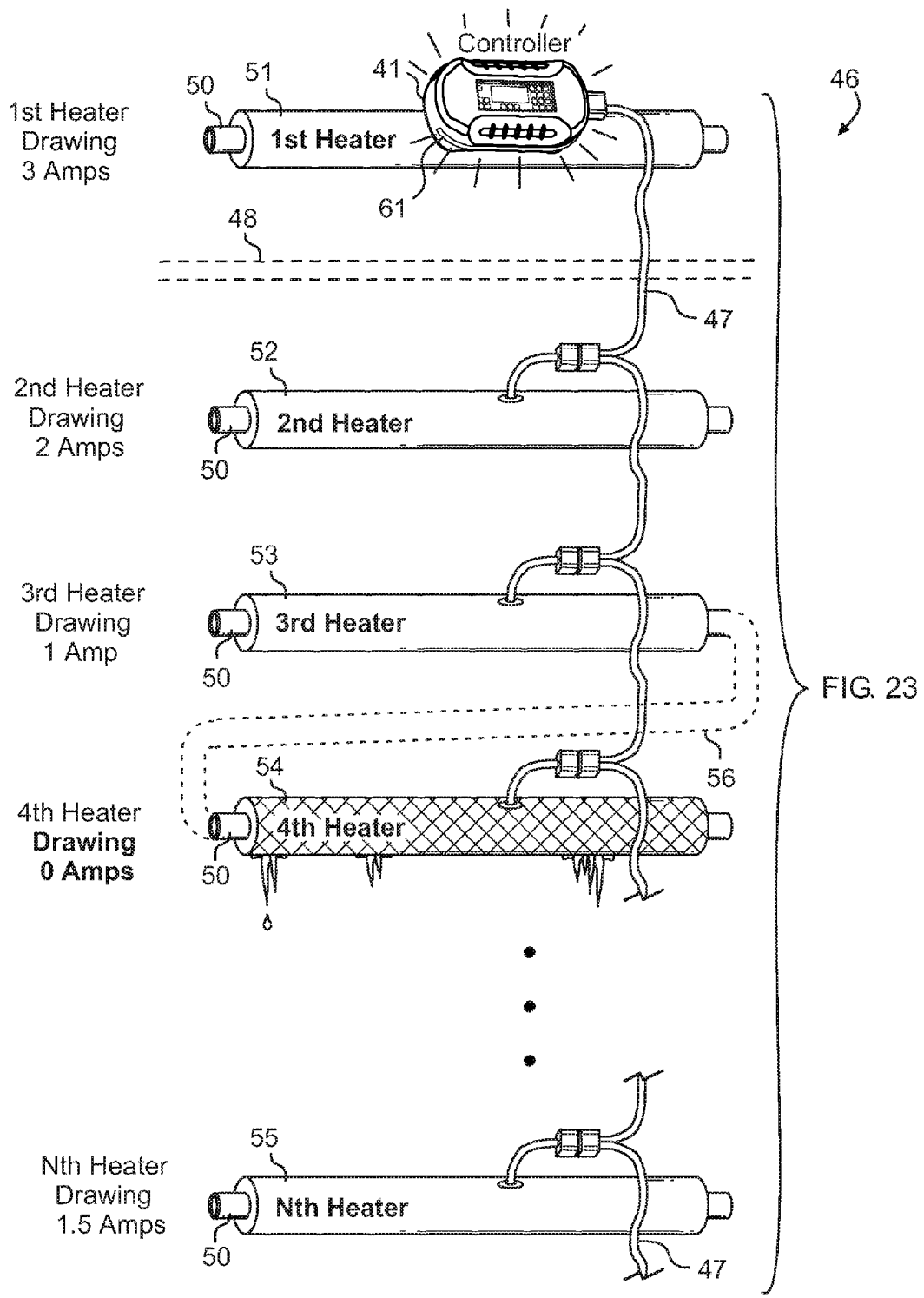
FIG. 23 is a diagrammatic perspective view of an electronically interconnected array of fluid line heaters connected to an improved visibility controller module according to an exemplary embodiment of a utilitarian aspect of the invention.
Figure 24:
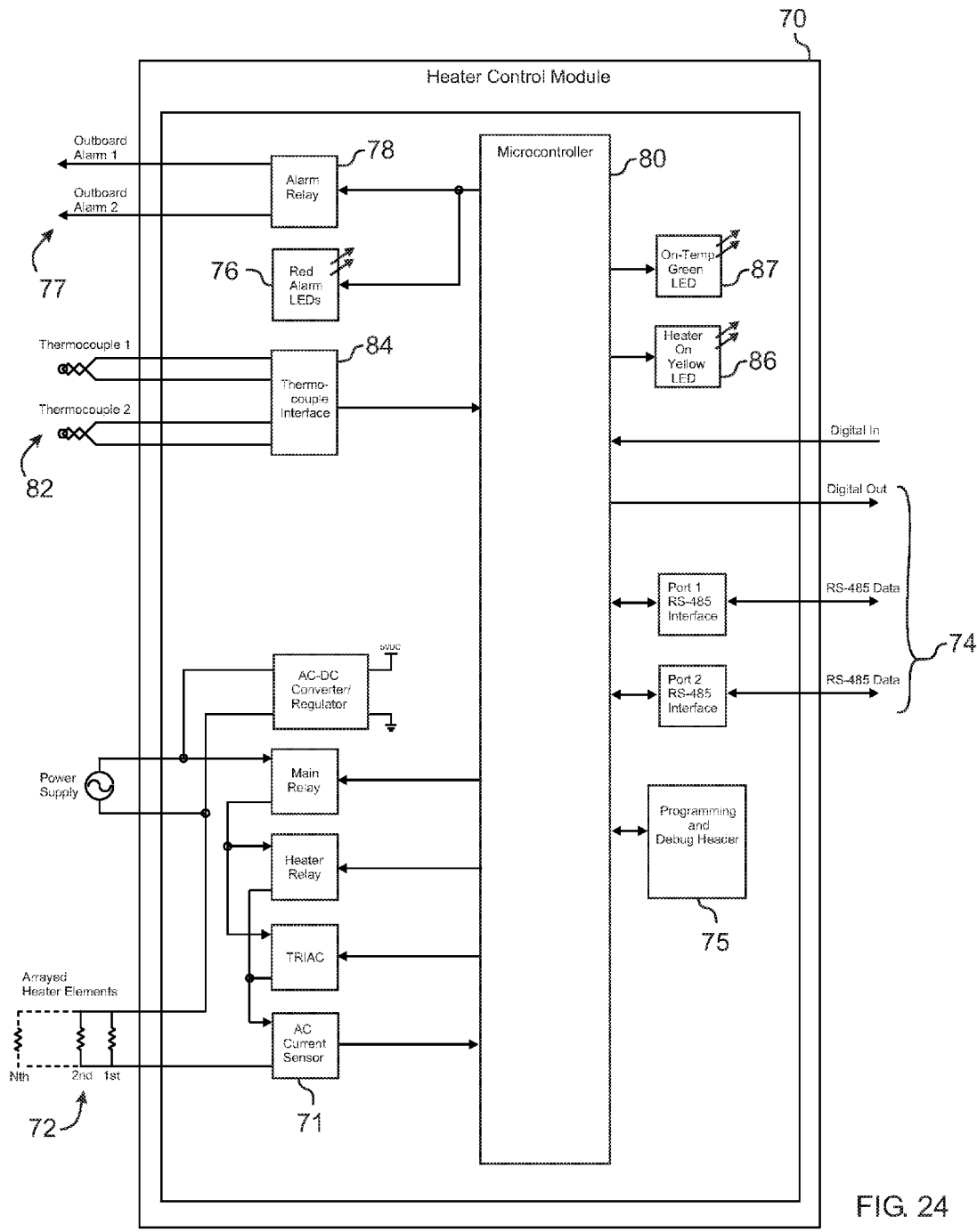
FIG. 24 is a functional block diagram of the electronic system of an improved visibility fluid line heater controller module according to an exemplary embodiment of a utilitarian aspect of the invention.

Referring now to FIGS. 23-24, a further utilitarian aspect of the improved visibility electronic module is described. An improved visibility heater controller module 41 can be used to control a plurality of fluid line heaters 51-55 for precisely heating a number of fluid lines 50 used in supplying and evacuating gasses and liquids from equipment used in semiconductor fabrication facilities. Those lines 50 can be physically connected 56 to form a single line where the heaters are located on spaced apart locations of the line, or can be independent lines.

The controller module can operate similarly to those disclosed in Gu et al., U.S. Patent Application Publication No. US2007/0235440; Bohlinger et al., U.S. Patent Application Publication No. US2006/0230298; and, Kreisel et al., U.S. Patent Application Publication No. US2006/0229740; all of which are incorporated herein by reference. Further, the controller can operate individually or as a slave in a broader network of additional controllers managed by a Supervisory Control and Data Acquisition ("SCADA") system for example.

As shown in FIG. 23, the improved viability controller module 41 can be electronically linked either wirelessly or by electrical cables 47 to form an interconnected array 46 of a number N of fluid line heaters 51-55. The module 41 can control the heating profiles of each of the respective heaters 51-55.

An important function of the controller module 41 is that it can detect and indicate that at least one of the heaters to which is linked is malfunctioning. For example, in FIG. 23, each nominally operating heater can draw between 1 and 3 amperes (A) of current. Thus the total current supplied to the array of nominally operating heaters would be a summation of the individual heater currents. As shown however, the $4^{th}$ Heater 54 is malfunctioning and drawing less current than it is supposed to at zero amperes (0 A). The controller can detect that the total current supplied to the array of heaters is less than the predetermined summation of the nominal currents, thus indicating an error condition and a malfunction of one or more heaters. This causes the controller module 41 to flash an error signal by changing the color of its light bar 61. Care should of course be taken that the total current drawn by the heaters does not exceed any maximum current allowed by the controller.

In this way a technician can merely view the light bar of the controller module and know whether a malfunction has occurred among that module's arrayed heaters. The technician can then undertake a closer inspection of the individual heaters to determine which of them are malfunctioning. One advantage of controlling an array of heaters using a single controller is that the controller module can be located in a highly visible location such as outside a wall 48 which can obscure the view of one or more of the arrayed heaters. In this way technicians can readily visually assess the status of all the arrayed heaters by quickly looking at the controller module from a distance and essentially any angle.

As shown in FIG. 24, an improvement in the electronics 70 of the controller module 41 allows the inclusion of a current sensor 71 for determining the draw by the associated heater or heaters 72 being controlled, the output of the current sensor can be fed to the module's digital microcontroller 80. If a the current sensor detects a current falling outside a predetermined acceptable range for the number of parallelly connected heaters, the microcontroller can declare a malfunction status condition. This malfunction status condition can in turn be communicated from the controller to a monitoring SCADA network through one or more digital output lines 74. The malfunction status can also be communicated to a keypad/display associated with the module via a programming and debug header 75. The malfunction status can also be communicated to the red LED 76 associated with the light bar 10, and one or more outboard alarms 77 such as audible alarms though an associated interface relay 78.

In this way the need for multiple sensors and controllers for each heater is eliminated, this substantially reducing the cost of a fluid line thermal management system.

In addition, the function of a heater or heaters can also be assessed by monitoring the heater temperature through one or more thermocouples (TCs) 82 through an interface 84.

The controller can also display non-malfunction statuses such as the heater array being powered and/or all the heaters in the array being at their desired temperature(s). Such statuses can be indicated by a yellow LED 86 and green LED 87 respectively which are associated with the light bar 10.

Figure 25:
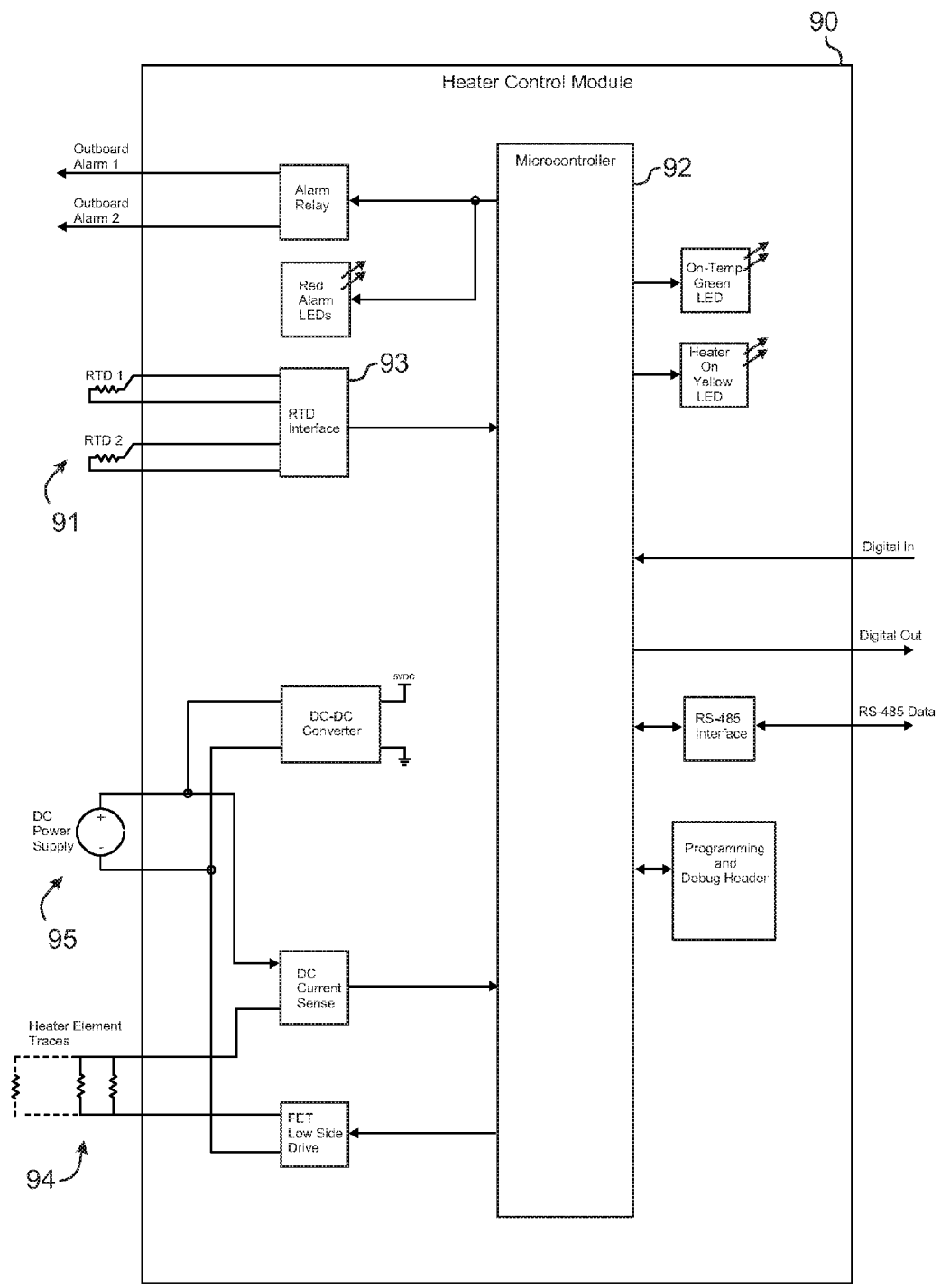
FIG. 25 is a functional block diagram of the electronic system of an improved visibility fluid line heater controller module according to an alternate exemplary embodiment of a utilitarian aspect of the invention.

As shown in FIG. 25, the controller electronics 90 can be adapted to control other devices such as ceramic heaters used in other fabrication equipment. The controller operates similarly to the controller of FIG. 24, however, the resistance thermal device (RTD) traces 91 can supply information via RTD interface circuitry 93 to the microcontroller 92 about the temperature status of heater traces 94 being powered by the controller. Further, DC power can be supplied to the controller by an outboard DC power source 95.

Although the above utilitarian aspects have been described in connection with the operation of an array of heater elements, it shall be understood that the above controller can monitor the status of a plurality of other current-drawing devices where the total current drawn by the non-malfunctioning devices is expected to remain within a predetermined nominal range.

While the preferred embodiments of the invention have been described, modifications can be made and other embodiments may be devised without departing from the spirit of the invention and the scope of the appended claims.

What is claimed is:

1. An electronic controller module for controlling the supply of power to plurality of fluid line heaters, said controller module comprises:
   a housing;
   wherein said plurality of fluid line heaters are electronically interconnected with said controller module;
   wherein each of said heaters can draw an amount of current when operating nominally;
   a current sensor within said housing wired to detect a total cumulative current drawn by said plurality of heaters; and,
   wherein said total cumulative current falling outside a predetermined range of current establishes a global malfunction status of said plurality heaters and causes a visual indication of said global malfunction using an oblong light emitter;
   wherein said housing comprises:
      an outer surface geometry oriented with respect to mutually orthogonal longitudinal, latitudinal, and elevational axes;
      wherein said longitudinal and said latitudinal axes define a plane substantially bisecting said housing and intersecting said housing along an arcuate peripheral surface portion;
      said oblong light emitter extending along said peripheral surface portion;
      wherein said oblong light emitter is dimensioned to allow visibility of at least a portion of said oblong light emitter at a maximum distance along said elevational axis where the line of sight forms an angle with said elevational axis of no more than 20 degrees.

2. The module of claim 1, wherein said emitter is coplanar with said plane, and wherein said emitter has a substantially uniform width dimension within said plane wherein said width dimension extends outwardly a distance beyond said peripheral surface portion.

3. The module of claim 1, wherein said emitter has a first end portion and a second end portion, and wherein said end portions are separated from one another by a gap.

4. An electronic controller system for controlling the supply of power to an array of fluid line heaters comprises:

a plurality of heaters wherein each of said heaters can draw an amount of current when operating nominally;
a controller module having a visual status indicator;
wherein said heaters are electronically interconnected with said controller module; and,
wherein a malfunction status of any of said heaters causes said visual status indicator to indicate a malfunction;
wherein said controller module further comprises:
a current sensor wired to detect a total cumulative current drawn by said plurality of heaters; and,
wherein said total cumulative current falling outside a predetermined range of current establishes a global malfunction status of said plurality heaters.

5. The system of claim 4, which further comprises:
each of said plurality of heaters drawing a first electrical current level within a nominal range during a non-malfunctioning operational status, and drawing a second electrical current level in a non-nominal range during a malfunctioning operational status; and,
wherein said first and second levels are detectably different.

6. A method of detecting a malfunction in at least one of a plurality of heaters for fluid lines used in semiconductor fabrication equipment, said method comprises:
supplying electrical power to said heaters through a master controller module having an improved visibility status light bar visible from any clear line-of-sight location a minimum distance away from said module;
measuring through said module a total electrical current supplied to said heaters;
detecting a drop in said total electrical current below a predetermined minimum level;
displaying a visual malfunction indication on said light bar in response to said detecting;
viewing said indication by a technician; and,
investigating which of said heaters is malfunctioning in response to said viewing.

\* \* \* \* \*